(12) United States Patent
Wakabayashi et al.

(10) Patent No.: US 8,061,743 B2
(45) Date of Patent: Nov. 22, 2011

(54) BUMPER REINFORCEMENT MEMBER

(75) Inventors: Masafumi Wakabayashi, Soja (JP);
Kouji Shimotsu, Soja (JP)

(73) Assignee: Asteer Co., Ltd., Okayama (JP)

( * ) Notice: Subject to any disclaimer, the term of this patent is extended or adjusted under 35 U.S.C. 154(b) by 16 days.

(21) Appl. No.: 12/592,270

(22) Filed: Nov. 19, 2009

(65) Prior Publication Data
US 2010/0127519 A1 May 27, 2010

(30) Foreign Application Priority Data
Nov. 21, 2008 (JP) ................................ 2008-298037

(51) Int. Cl.
*B60R 19/02* (2006.01)
(52) U.S. Cl. ......................................................... 293/102
(58) Field of Classification Search .................. 293/102, 293/120–122
See application file for complete search history.

(56) References Cited

U.S. PATENT DOCUMENTS
6,609,740 B2 * 8/2003 Evans ........................... 293/121
6,813,920 B2 * 11/2004 Yoshida et al. .................. 72/166

FOREIGN PATENT DOCUMENTS
JP 2003-237507 8/2003
JP 2004-074834 3/2004
JP 2005-170234 6/2005

* cited by examiner

*Primary Examiner* — Dennis Pedder
(74) *Attorney, Agent, or Firm* — DLA Piper LLP (US)

(57) ABSTRACT

A bumper reinforcement member 1 includes a small groove 2 and a large groove 3. The large groove 3 is arranged to encompass the small groove 2 inside the groove. When the bumper reinforcement member 1 is deformed, directions of the deformation of the lateral face of the small groove and the deformation of the lateral face of the large groove are oppose to each other, and thus the peak load and the energy absorption amount of the bumper reinforcement member 1 can be increased with a simple configuration.

4 Claims, 21 Drawing Sheets

BUMPER REINFORCEMENT MEMBER

BACKGROUND OF THE INVENTION

1. Field of the Invention

The present invention relates to a bumper reinforcement member configuring a bumper of a vehicle.

2. Description of the Related Art

The bumper of a vehicle is configured by a bumper reinforcement member for absorbing impact, and a bumper cover for covering the bumper reinforcement member. The bumper reinforcement member absorbs impact by deforming a hollow section (plastic deform of a face that forms the section). In general, a superior bumper has a high maximum value (peak load) in a three-point bending test applying a load at one point and supports a test piece at other two points, a larger deformed amount and the larger value of integral (in other words, impulse or gross amount of energy absorption). The energy absorption property in the bumper reinforcement member can be enhanced by thickening each face that is plastic-deformed, using a high strength material, or making the cross section complicating.

JP2005-170234A discloses a bumper reinforcement member (impact absorption member) including a plurality of vertical walls having different heights (width in a front and back direction of a vehicle) and a horizontal wall that couples the vertical walls to each other. The bumper reinforcement member is formed with a step at the horizontal wall (4, 5, 9 in FIG. 1). The vertical walls are arranged in a positional relationship of interfering with each other when buckled or crushed by impact. According to such bumper reinforcement member, the peak load that occurs first (initial peak load) becomes small and the energy absorption amount can be enhanced since the impact is applied in a step wise manner.

The bumper reinforcement member disclosed in JP2005-170234A has a problem in that the deformation of each vertical wall is not uniform as the vertical wall is long. Therefore, the vertical walls may not necessarily interfere when buckled or crushed. Even if the vertical walls are assumed to interfere with each other, the vertical walls are believed to not interfere with each other unless the respective vertical walls are greatly buckled or crushed since each vertical wall is greatly spaced apart. Furthermore, the peak of the load to be absorbed greatly increases or decreases (see graph of FIG. 5) and a stable energy absorption property may not be obtained as a whole. Moreover, since the load to be absorbed increases and decreases, the energy absorption inevitably becomes small as a whole.

JP2003-237507A discloses a bumper reinforcement member including a main reinforcement member 1 supported to a vehicle body side, and a supplementary reinforcement member 3 to be attached to a front face of the main reinforcement member. The supplementary reinforcement member has a substantially concaved sectional portion 2 and the main reinforcement member has a concaved groove portion 5. The substantially concaved sectional portion 2 is in contact with the concaved groove portion 5. The bumper reinforcement member disclosed in JP2003-237507A does not require special members. The structure is also easy to process. Changes in material and production facilities are unnecessary, and increase in cost can be suppressed. Furthermore, the energy absorption amount is enhanced while suppressing local buckling.

The bumper reinforcement member disclosed in JP2003-237507A can stabilize the load to be absorbed and obtain a large energy absorption amount. However, since the supplementary reinforcement member is attached to the front face of the main reinforcement member, and the supplementary reinforcement member greatly projects out from the front face of the main reinforcement member, the bumper reinforcement member inevitably becomes large. Increase in weight also becomes a problem. Variety of design is also limited. Thus, the bumper reinforcement member disclosed in JP2003-237507A is difficult to use in light automobiles to which weight limits and layout limits are strictly imposed and automobiles having high designability.

JP2004-074834A discloses a bumper reinforcement member including a main reinforcement member 3 of a rear face opened sectional structure with a front face 9, an upper lateral face 10 and a lower lateral face 11, and an supplementary reinforcement member bridged to upper and lower lateral faces from the front face of the main reinforcement member. The supplementary reinforcement member has a mountain folded portion 14 on the front face 9. The main reinforcement member 3 includes, on the front face, a front face groove 2 having a concaved cross section with a groove bottom face 12 and a groove lateral face 11, and the supplementary reinforcement member 1 is bridged to each upper and lower lateral face from the front face groove. The bumper reinforcement member disclosed in JP2004-074834A has a rear face opened sectional structure (structure in which the rear face is opened). The bumper reinforcement member has a high peak load and a large gross amount of energy absorption that are not inferior to the bumper reinforcement member of a closed sectional structure.

The bumper reinforcement member disclosed in JP2004-074834A is not as enlarged as the bumper reinforcement member disclosed in JP2003-237507A since the supplementary reinforcement member is arranged inside the main reinforcement member. However, the invention described in JP2004-074834A is merely improved from the bumper reinforcement member of the rear face opened sectional structure, which is believed to be inferior to the bumper reinforcement member of the closed sectional structure. In other words, controlling the deformation of the bumper reinforcement member of the rear face opened sectional structure is significant concern of JP2003-237507A, and the energy absorption property of the same extent as the bumper reinforcement member of the closed sectional structure is merely ensured. The bumper reinforcement member disclosed in JP2004-074834A does not further increase the peak load or increase the gross amount of energy absorption.

The energy absorption property in the bumper reinforcement member can be enhanced by thickening each face that is plastic-deformed, using a high strength material, or making the cross section complicating. However, the bumper reinforcement member is enlarged and the weight becomes excessively large if each face is thickened. The manufacturing cost becomes high if the high strength material is used. Making the cross section complicating deprives the variety of design of the bumper reinforcement member and has a possibility of influencing the design of the entire vehicle. Therefore, miniaturization, reduction in manufacturing cost, and simplification of the cross section become important issues in enhancing the energy absorption property.

The present invention overcomes the problems of the invention described in JP2003-237507A and the invention described in JP2004-074834A, and aims to further increase the peak load and the gross amount of energy absorption without increasing manufacturing costs.

SUMMARY OF THE INVENTION

Present invention is a bumper reinforcement member of a hollow section comprises a front face, a pair of upper and lower lateral faces; wherein a small groove and a large groove concaved to back side, which have channel shaped cross section and housed in the hollow section, are provided at the front face; and the small groove includes a pair of upper and lower lateral faces, and a groove bottom face, the large groove includes a pair of upper and lower lateral faces, and a groove bottom face, an open space is provided between the groove bottom face of the small groove and the groove bottom face of the large groove, and the pair of upper and lower lateral faces of the small groove is totally encompassed by the pair of upper and lower lateral faces of the large groove.

Above-said large groove and small groove mean that the large groove is deeper than the small groove. In other words, the open space is provided between the groove bottom face of the small groove and the groove bottom face of the large groove. The width of the grooves is not particularly limited. For example, the width of the small groove may be wider than that of the large groove, as in FIG. 8.

Above-said "a bumper reinforcement member of a hollow section" refers to a bumper reinforcement member of a structure interiorly including a hollow portion continuing in an extending direction (normally, left and right direction of the vehicle) of the bumper reinforcement member. Whether the rear face is closed or opened is not particularly limited. The bumper reinforcement member of the present invention can be manufactured through aluminum extrusion, grind molding, and sheet-meal processing. The sheet-meal processing is preferable as the bumper reinforcement member can be easily and inexpensively manufactured.

According to the present invention, the deformation of the lateral faces of the large groove in up and down directions and the deformation of the lateral faces of the small groove in up and down directions oppose each other so as to suppress the respective deformations. A peak load of the force-stroke property (load-displacement property) thus can be increased. The lateral faces of the large groove and the lateral faces of the small groove both continue to suppress the respective deformations to thereby increase the gross amount of the energy absorption.

In the present invention, a distance A, which is defined by the smallest distance between a pair of upper and lower lateral faces of the large groove and a pair of corners of the small groove connecting the upper and lower lateral faces and the groove bottom face, a depth B of the small groove, which is defined by a distance between the front face of the bumper reinforcement member (front face of a main reinforcement member) and the groove bottom face of the small groove, and a depth L of the large groove, which is defined by a distance between the front face of the bumper reinforcement member and the groove bottom face of the large groove preferably meet a following condition; the distance A is from 0 to $1/10$ of the depth L of the large groove (A=0 L to $1/10$ L); and the depth B of the small groove is from $1/10$ to $1/2$ of the depth L of the large groove (B=$1/10$ L to $1/2$ L). The "depth B" of the small groove refers to the smallest orthogonal distance between the front face of the bumper and the front side of the groove bottom face of the small groove. The smallest "distance A" from the corner to the lateral face of the large groove refers to the smallest orthogonal distance between the surface of the corner and the lateral face of the large groove.

When force is applied from the front face of the bumper reinforcement member, the large groove and the small groove make substantially the former portion (closer to the front face of the bumper) bulge inward (direction of approaching the horizontal line evenly dividing the bumper into upper and lower) and substantially the latter portion (closer to the groove bottom face of the large groove or the groove bottom face of the small groove) bulge outward (direction of separating from above said horizontal line) (see FIG. 10 to be hereinafter described). The deformation at the former portion of the large groove and the deformation at the latter portion of the small groove reliably interfere by making the depth B of the small groove smaller than or equal to $1/2$ of the depth L of the large groove, whereby the respective deformations can be suppressed. However, the lateral face of the small groove becomes hard to be deformed if the depth B of the small groove is too small. The depth B of the small groove is preferably greater than or equal to $1/10$.

Immediately after the large groove starts to be deformed inward, the small groove is preferably deformed to the outer side so that the respective deformations are opposed to each other. Therefore, the smallest distance A is preferably "0 (zero)". In other words, the interference of the deformation of the large groove and the deformation of the small groove delays as the smallest distance A becomes greater. The effect of suppressing the respective deformations is lost when the distance A becomes excessively large. Specifically, the smallest distance A is preferably smaller than or equal to $1/10$ of the depth L of the large groove. Therefore, the deformations of the lateral face of the large groove and the lateral face of the small groove reliably interfere by making the distance A from 0 to $1/10$ of the depth L of the large groove, whereby the effects of the present invention are obtained.

When a space between the pair of upper and lower lateral faces of the large groove gradually becomes smaller towards the back side in an advancing direction of the vehicle so that the pair of lateral faces surround the small groove (namely, at least respective former parts of the upper and lower lateral faces form a pair of inclined faces surrounding the small groove), the smallest distance between the a pair of corners of the small groove and a pair of inclined faces is desirably smaller than or equal to $1/10$ of the depth L of the large groove. The inclined faces of the large groove are deformed so as to bulge out towards the small groove due to the presence of the two corners adjacent to the inclined face of the large groove, whereby the deformations of the large groove and the small groove can be easily interfered. The pair of inclined faces substantially elongates the length of the lateral faces of the large groove, and is used when increasing the width of the small groove. In particular, when making the width of the small groove relatively larger than the width of the large groove in regards with the vehicle design. The inclined face can be formed within a range of the depth L of the large groove from the front face of the bumper. In other words, the entire lateral face of the large groove may be the inclined face. The angle θ with respect to the lateral face of the large groove orthogonal to the front face of the bumper is smaller than or equal to 60 degrees. In other words, the inclined face of angle 0 (zero) degree is the lateral face of the large groove orthogonal to the front face of the bumper.

The smallest "distance A" of a pair of corners, connecting the upper and lower lateral faces of the small groove and the groove bottom face of the small groove, and the pair of inclined faces refers to the smallest orthogonal distance connecting the surface of the respective corners and the inclined faces. The inclined faces substantially elongate the length of the lateral faces of the large groove. When the pair of inclined faces is provided in the large groove, the distance between the pair of corners and the pair of inclined faces inevitably separates. Therefore, the corners may be opened outward and the front face of the bumper or the lateral faces of the small groove may be easily deformed (each triangular cross section formed by the inclined face, the front face of the bumper, and the lateral face of the small groove may be crushed). To prevent this, at least one bulged portion is desirably formed at the corner connecting the front face of the bumper and the lateral face of the small groove. A bulging direction of the bulged portion is not particularly limited, but preferably bulges (projects) out towards the front side with respect to the front face of the bumper. The sectional shape of the bulged portion is desirably an arcuate shape. In this case, to prevent only the bulged portion from colliding with an obstacle before the front face of the bumper, the supplementary bulged portion that collides with the obstacle is desirably separately arranged at the front face of the bumper. The bulged portion or the supplementary bulged portion act as a reinforcement bead with respect to the front face of the bumper, and increases the peak load.

The present invention is suited to a bumper reinforcement member made of sheet-meal. That is a bumper reinforcement member made of sheet-meal configured by a main reinforcement member and a supplementary reinforcement member. The supplementary reinforcement member is positioned at back side of the main reinforcement member and is attached to the main reinforcement member. The main reinforcement member has a hollow section including a front face and the pair of upper and lower lateral faces. A small groove of channel shaped cross section including the pair of upper and lower lateral faces and the groove bottom face is formed at the front face of the main reinforcement member. The rear edges of the lateral faces of the main reinforcement member are connected to and supported by the vehicle body side. The supplementary reinforcement member is a member having a front face opened structure with the large groove of an opened channel shaped cross section including the pair of upper and lower lateral faces and the groove bottom face. The supplementary reinforcement member is supported by connecting the front edges extending from the upper and lower lateral faces of the large groove to a back side of the front face of the main reinforcement member. The groove bottom face of the large groove can be connected to the vehicle body side to more securely fix a position.

The main reinforcement member of "hollow section" refers to a main reinforcement member having a sectional structure in which the rear face is closed or a main reinforcement member having a sectional structure in which the rear face is opened. The main reinforcement member may be supported by directly connecting the rear edges of the upper lateral face and the lower lateral face of the bumper to a vehicle body (vehicle frame), or indirectly connecting the same through an impact absorption member and the like. As hereinafter described, the main reinforcement member may be indirectly connected to the vehicle body side through the supplementary reinforcement member.

The supplementary reinforcement member of the "front face opened sectional structure" refers to a supplementary reinforcement member having a sectional structure in which the front face is opened. The supplementary reinforcement member is supported by connecting the groove bottom face of the large groove to the vehicle body side. The supplementary reinforcement member is supported by connecting the front edges extending from the lateral faces of the large groove to the main reinforcement member. That is, the main reinforcement member that becomes the front face of the bumper is indirectly supported on the vehicle body side through the supplementary reinforcement member. The front edge extending from the lateral face of the large groove of the supplementary reinforcement member may be directly connected to the back side of the front face of the bumper. However, it is preferable to connect the back side of the front face of the bumper and the supplementary reinforcement member through a flange provided at the front edge of the lateral face.

The pair of lateral faces of the large groove of the supplementary reinforcement member may be the pair of inclined faces where the space gradually becomes smaller in a region surrounding the small groove with the upper and lower lateral faces. The "region surrounding the small groove with the upper and lower lateral faces" refers to the lateral faces of the large groove which corresponds to the area from the front edges to be connected to the back side of the front face of the bumper to the bottom portion of the small groove. It is not necessary to make whole of the upper and lower lateral faces incline. At least respective former parts of the upper and lower lateral faces may incline. In this case, at least one bulged portion is preferably formed at a corner of the main reinforcement member connecting the front face of the bumper and the lateral face of the small groove, as described above. Similar to the above, the bulged portion acts as a reinforcement bead with respect to the front face of the bumper, and increases the peak load.

In the bumper reinforcement member made of sheet-meal, the positional relationship between the main reinforcement member and the supplementary reinforcement member may be interchanged. In other words, in the bumper reinforcement member configured by the main reinforcement member and the supplementary reinforcement member, the supplementary reinforcement member being positioned at a front side of the main reinforcement member and being attached to the main reinforcement member. The main reinforcement member has a hollow sectional structure including the front face, the pair of upper lower lateral faces. The front face of the main reinforcement member is formed with a large groove of channel shaped cross section including the pair of upper lateral and lower lateral faces, and the groove bottom face. The supplementary reinforcement member is a member having a cross section of a flanged hat that forms the small groove including the pair of upper and lower lateral faces, the groove bottom face and connection flanges. The supplementary reinforcement member is supported by the main reinforcement member by connecting (via plane contact) the connection flanges provided at the front edges extending from the upper and lower lateral faces of the small groove to the front side of the front face of the main reinforcement member. The rear edges of the upper and lower lateral faces of the main reinforcement member and the groove bottom face of the large groove are connected to the vehicle body side.

The main reinforcement member of the "hollow sectional structure" refers to a main reinforcement member of a sectional structure in which the rear face is closed or a main reinforcement member of a sectional structure in which the rear face is opened. The main reinforcement member may be directly connected to the vehicle body (vehicle frame) by way of the rear edges of the upper lateral face and the lower lateral face and the groove bottom face of the large groove, or may be indirectly connected by way of the impact absorption member and the like. The supplementary reinforcement member of "a cross section of a flanged hat" refers to a supplementary reinforcement member having a sectional structure of a flanged channel without a lid (front face is opened). The supplementary reinforcement member does not have a portion to be connected to the vehicle body side, and is supported by the main reinforcement member.

A pair of lateral faces of the large groove of the main reinforcement member may be a pair of inclined faces where the space between the upper lateral face and the lower lateral face gradually becomes smaller in a region surrounding the small groove formed by the supplementary reinforcement member with the upper and lower lateral faces.

In this case, at least one bulged portion is preferably formed at the corner connecting the connection flange and the lateral face of the small groove. Similar to the above, the bulged portion acts as a reinforcement bead with respect to the front face of the bumper, and increases the peak load.

According to the present invention, enlargement and increase in manufacturing cost can be prevented, and the energy absorption property can be enhanced without affecting the design. Specifically, enlargement can be prevented (miniaturization) since the large groove and the small groove are housed in a region surrounded by the front face of the bumper and the lateral faces of the bumper. Furthermore, the manufacturing cost can be suppressed low (simplification) since the structure of the large groove and the small groove is simple. The miniaturization and the simplification assure a huge variety of designs. Furthermore, with the combination of the large groove and the small groove of suppressing the respective deformations, the peak load and the gross amount of energy absorption are increased.

The bumper reinforcement member of the present invention has a structure particularly suited to the bumper reinforcement member made of sheet-meal, which is easy and inexpensive to manufacture. Specifically, enlargement can be prevented as the supplementary reinforcement member is housed in the outer shape of the main reinforcement member. The increase in manufacturing cost is prevented since the processing in the formation of the large groove and the small groove is easy. Since the supplementary reinforcement member is housed in the outer shape of the main reinforcement member and the processing of the large groove and the small groove is easy, a huge variety of designs are adaptable. The mutual suppression of deformations of the large groove and the small groove, which is a technical feature of the present invention, is exhibited even in the bumper reinforcement member made of sheet-meal, and thereby the peak load and the gross amount of energy absorption can be increased.

DETAILED DESCRIPTION OF THE PREFERRED EMBODIMENTS

Figure 1:
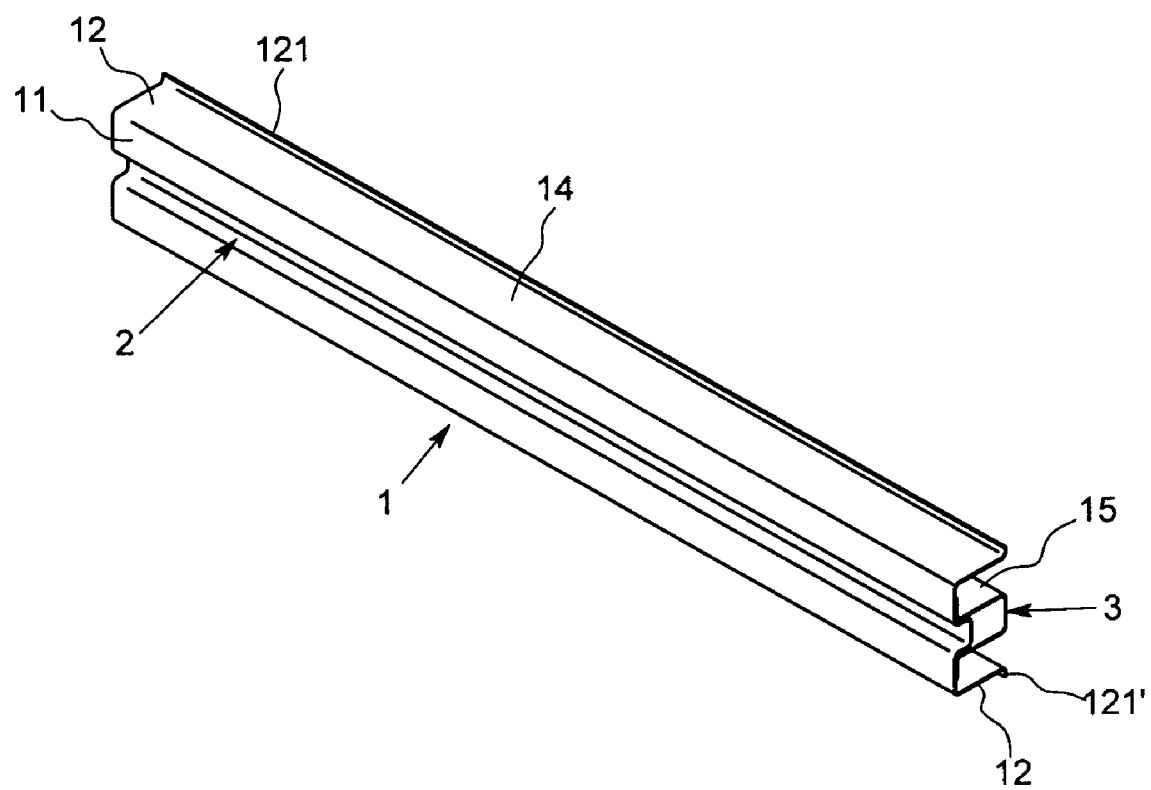
FIG. 1 is a perspective view illustrating a bumper reinforcement member of one example in which a small groove is formed at a main reinforcement member of a rear face opened sectional structure and a supplementary reinforcement member is a large groove.
Figure 2:
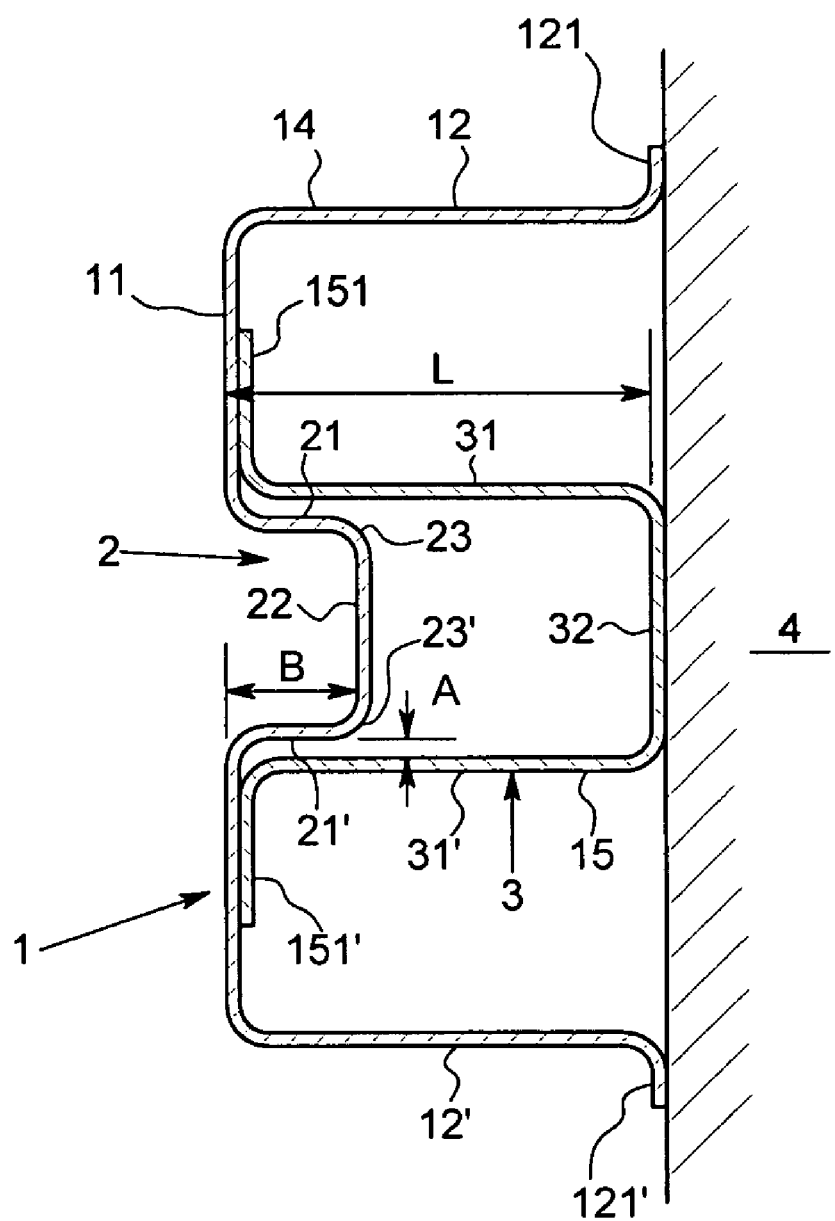
FIG. 2 is a sectional view illustrating the bumper reinforcement member of the present example.

The best modes for carrying out the present invention will be described below with reference to the drawings. FIG. 1 is a perspective view illustrating a bumper reinforcement member 1 of one example in which a small groove 2 is formed at a main reinforcement member 14 of a rear face opened sectional structure and a supplementary reinforcement member 15 is a large groove 3, and FIG. 2 is a sectional view illustrating the bumper reinforcement member 1 of the present example. In FIG. 2 and subsequent sectional views, rear edges 121, 121' of the lateral faces (upper lateral face 12, lower lateral face 12') and groove bottom face 32 of the large groove 3 are connected to a specific vehicle frame assembled with a mold steel and a pipe, and a specific impact absorption member projected out from the vehicle frame, where a face to connect the rear edge (upper rear edge 121, lower rear edge 121') of the upper and lower lateral faces 12, 12' and the groove bottom face 32 of the large groove 3 are illustrated as a vehicle body 4, for the sake of convenience of illustration, since the configuration or the structure of the specific vehicle frame and the impact absorption member are free in the present invention.

As illustrated in FIG. 1 and FIG. 2, the bumper reinforcement member 1 of the present invention is configured by combining the main reinforcement member 14 and the supplementary reinforcement member 15 made of plate steel. The main reinforcement member 14 configuring the bumper reinforcement member 1 of the present example has the rear face opened sectional structure with a front face 11, an upper lateral face 12, and a lower lateral face 12'. The small groove 2 including an upper lateral face 21, a lower lateral face 21', and a groove bottom face 22 is formed at the front face 11, and the rear edges (upper rear edge 121, lower rear edge 121') of the upper and lower lateral faces 12, 12' are connected to the vehicle body 4 by spot welding and the like. The supplementary reinforcement member 15 is a front face opened sectional structure with the large groove 3 including an upper lateral face 31, a lower lateral face 31', and a groove bottom face 32, where connection flanges (upper connection flange 151, lower connection flange 151') arranged at front edges of the upper and lower lateral faces 31, 31' are connected to the back side of the front face 11 of the main reinforcement member 14 by spot welding and the like. The groove bottom face 32 is also connected to the vehicle body 4 by spot welding.

The width of the small groove 2 (opposing distance of lateral faces 21, 21' of small groove) may be appropriately determined in accordance with a vehicle design. A depth B of the small groove 2 from the front face 11 of the bumper to the groove bottom face 22 of the small groove is from $1/10$ to $1/2$ of a depth L of the large groove 3 defined by the distance from the front face 11 of the bumper to the groove bottom face 32 of the large groove (B=$3/10$ L in the present example). The depth B of the small groove 2 is a parameter directly related to both a peak load and a gross amount of energy absorption. When the depth B is from $1/4$ to $3/10$ of the depth L of the large groove 3, the largest value of the peak load and the gross amount of energy absorption is obtained. Therefore, when subjected to limitations in vehicle design and the like, the depth B of the small groove 2 is preferably from $1/10$ to $1/2$ of the depth L of the large groove 3, and the depth B of the small groove 2 is more preferably determined in the range from $1/4$ to $3/10$ of the depth L of the large groove 3. The depth L of the large groove 3 is determined so that the groove bottom face 32 of the large groove can be connected to the vehicle body 4.

The smallest distance A from a corner (upper corner 23, lower corner 23'), which connects the lateral face (upper lateral face 21, lower lateral face 21') and the groove bottom face 22 of the small groove, to the lateral face (upper lateral face 31, lower lateral face 31') of the large groove is smaller than or equal to $1/10$ of the depth L of the large groove 3 (A=$1/20$ L in the present example). In the present invention, when the distance A becomes large (corners 23, 23' connecting lateral faces 21, 21' of small groove and groove bottom face 22 of small groove become farther from the lateral faces 31, 31' of large groove), the effects of the present invention are not exhibited. However, problems do not arise if the distance A is small. Therefore, the corners 23, 23' connecting the lateral faces 21, 21' and the groove bottom face 22 of the small groove may be closely attached to the lateral face 31, 31' of the large groove. The width of the large groove 3 (opposing distance of lateral faces 31, 31') is a numerical value obtained by adding the distance A twice to the width of the small groove 2. As the bumper reinforcement member 1 is symmetric with respect to a line dividing the bumper upper and lower in this example, the distance A from the upper lateral face 31 to the upper corner 23 and the distance A from the lower lateral face 31' to the lower corner 23' are equal.

The bumper reinforcement member 1 of the present example uses the same material for the main reinforcement member 14 and the supplementary reinforcement member 15, and also has such reinforcement members formed to the same plate thickness. Since the present invention merely needs to be able to oppose the deformations of the large groove 3 and the deformation of the small groove 2, the main reinforcement member 14 and the supplementary reinforcement member 15 may be made of different materials or may have different plate thicknesses as long as the large groove 3 and the small groove 2 are deformed by the same amount at the same timing. The corners connecting each face are all formed to an arcuate cross section, but the size of the radius of the circular arc does not influence the effect of the present invention. Thus, the corner connecting the front face 11 of the bumper and the lateral face 21, 21' of the small groove may be formed to a right angle, if possible.

Figure 3:
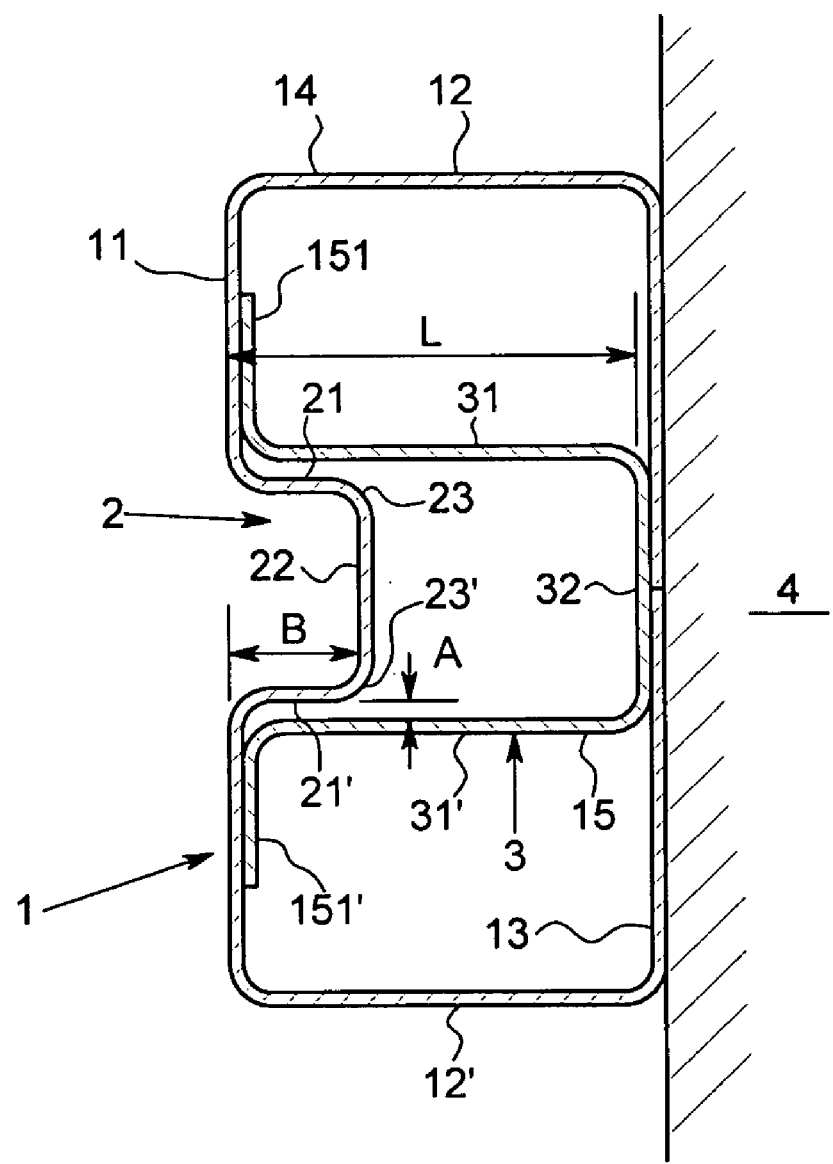
FIG. 3 is a sectional view corresponding to FIG. 2 illustrating the bumper reinforcement member of another example in which the small groove is formed at the main reinforcement member of a rear face closed sectional structure and the supplementary reinforcement member is the large groove.
Figure 4:
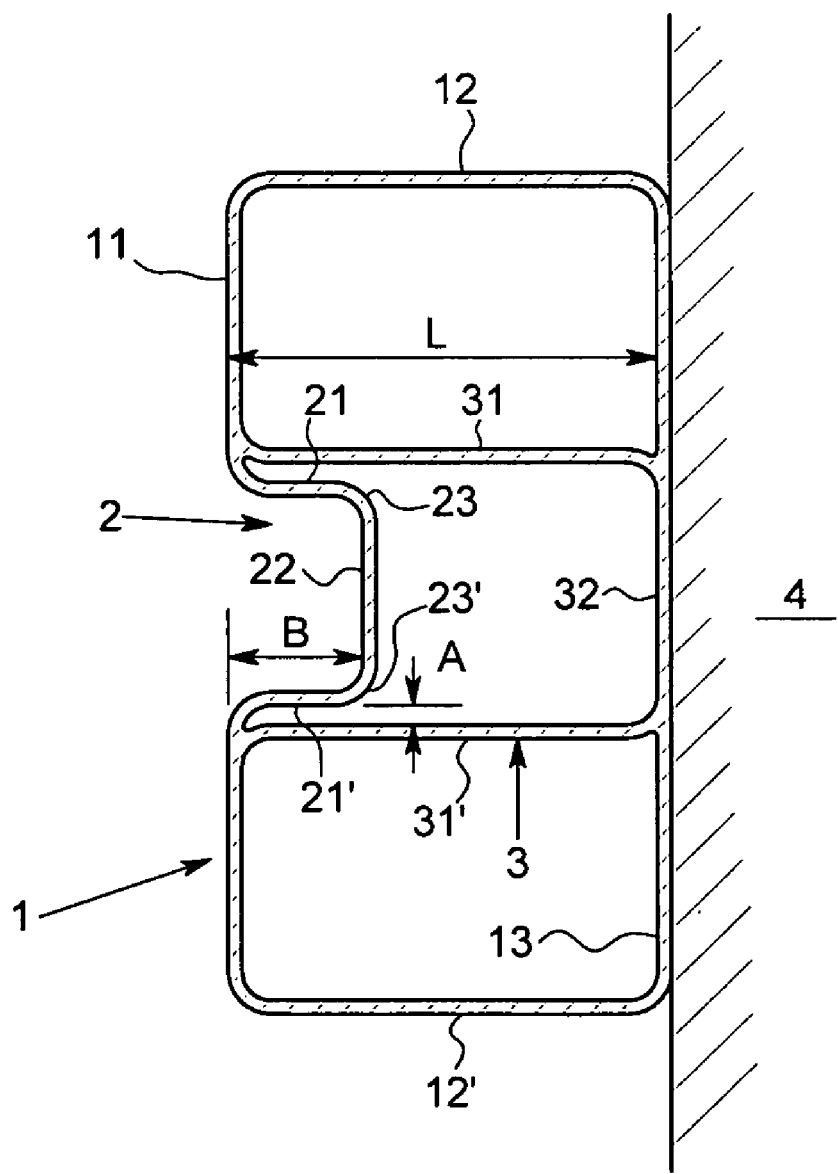
FIG. 4 is a sectional view corresponding to FIG. 2 illustrating the bumper reinforcement member of another example entirely integrally molded, including the small groove and the large groove, by extrusion.

In the present invention, the bumper reinforcement member 1 includes the small groove 2 and the large groove 3, and the large groove 3 encompasses the small groove 2. Therefore, as described above (see FIG. 1 and FIG. 2), the bumper reinforcement member 1 made of plate steel having the rear face opened sectional structure may be adopted or the bumper reinforcement member 1 obtained by aluminum extrusion may be adopted (FIG. 4). FIG. 3 is a sectional view corresponding to FIG. 2 illustrating the bumper reinforcement member 1 of another example in which the small groove 2 is formed at the main reinforcement member 14 of a rear face closed sectional structure and the supplementary reinforcement member 15 is the large groove 3. FIG. 4 is a sectional view corresponding to FIG. 2 illustrating the bumper reinforcement member 1 of another example entirely integrally molded, including the small groove 2 and the large groove 3, by extrusion.

The bumper reinforcement member 1 of another example of FIG. 3 replaces the main reinforcement member 14 of the above description (see FIG. 1 and FIG. 2) with the rear face closed sectional structure. The main reinforcement member 14 has the rear face closed sectional structure including the front face 11 of the bumper, the upper lateral face 12, the lower lateral face 12', and the bumper rear face 13. The front face of the main reinforcement member is formed with the small groove 2 including the upper lateral face 21, the lower lateral face 21', and the groove bottom face 22. The main reinforcement member connects a rear face 13 of the bumper to the vehicle body 4 by spot welding and the like. The bumper rear face 13 is formed by abutting the extended face, which is obtained by bending the upper lateral face 12, and the extended face, which is obtained by bending the lower lateral face 12', at the middle. The supplementary reinforcement member 15 is configured in the same manner of present example (see FIG. 2 and its description) mentioned above.

The bumper reinforcement member 1 of another example illustrated in FIG. 4 is entirely manufactured through aluminum extrusion. In other words, the main reinforcement member 14 and the supplementary reinforcement member 15 do not have a boundary, and the large groove 3 and the small groove 2 are integrally molded. Specifically, the bumper reinforcement member 1 is a member of the rear face closed sectional structure including the front face 11, the upper lateral face 12, the lower lateral face 12', and the bumper rear face 13. The front face 11 is integrally formed with the small groove 2 including the upper lateral face 21, the lower lateral face 21', and the groove bottom face 22. Similarly, the front face 11 is integrally formed with the large groove 3, which encompasses the small groove 2 and which includes the upper lateral face 31, the lower lateral face 31', and the groove bottom face 32. The bumper rear face 13 is connected to the vehicle body 4 by spot welding and the like. The bumper reinforcement member 1 of another example illustrated in FIG. 4 is entirely manufactured by integral molding, and thus the smallest distance A of "0 (zero)" is difficult to obtain. The smallest distance A is preferably made as small as possible as long as the lateral face 21 of the small groove and the lateral face 31 of the large groove can be independently deformed.

Figure 5:
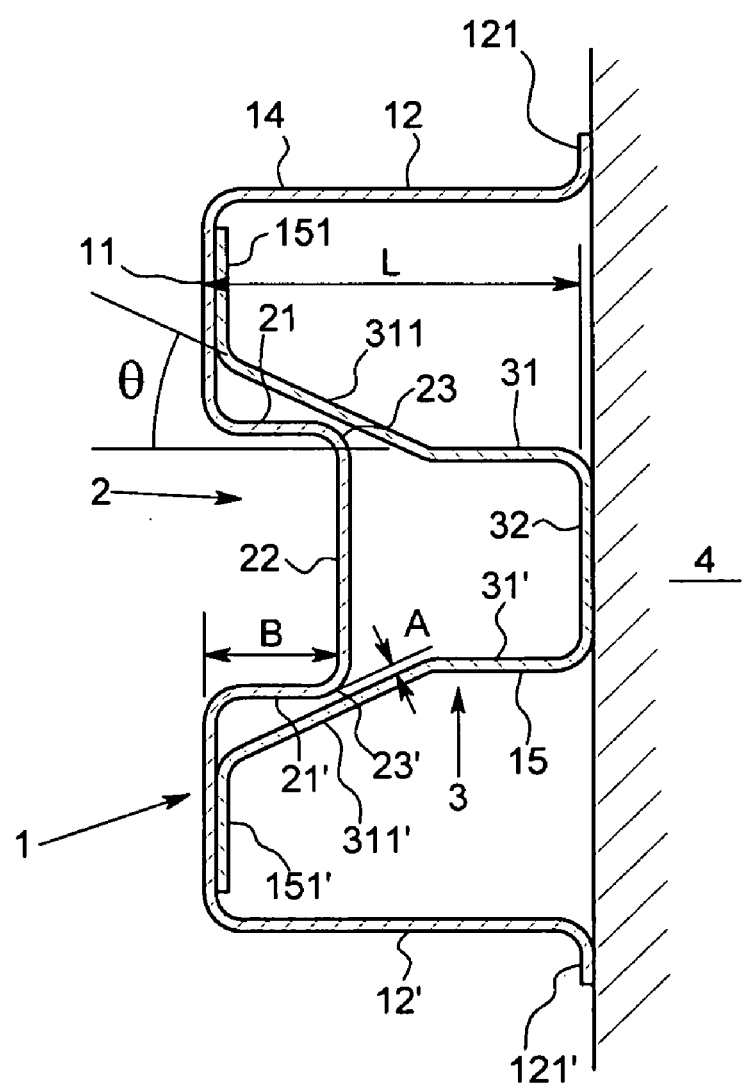
FIG. 5 is a sectional view corresponding to FIG. 2 illustrating the bumper reinforcement member of another example in which the small groove is formed at the main reinforcement member of the rear face opened sectional structure, and one part of a pair of upper and lower lateral faces of the large groove, which is formed at the supplementary reinforcement member, is formed as a pair of inclined faces.
Figure 6:
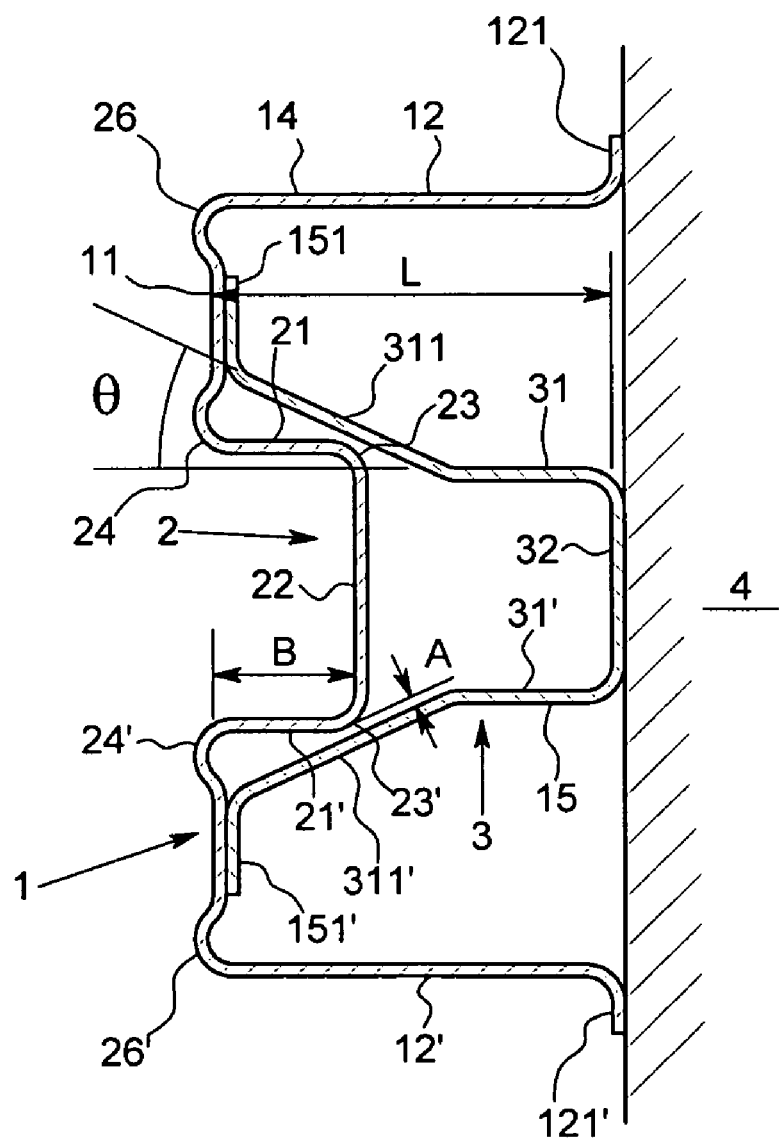
FIG. 6 is a sectional view corresponding to FIG. 2 illustrating the bumper reinforcement member of another example in which the small groove is formed at the main reinforcement member of the rear face opened sectional structure, respective former parts of the upper and lower lateral faces of the large groove are formed as the inclined faces, and a pair of bulged portions is provided at the pair of corners connecting a front face of the bumper and the upper and lower lateral faces of the small groove.

In the bumper reinforcement member 1 of the present example (see FIG. 1 and FIG. 2), the lateral faces 31, 31' of the large groove may be inclined faces (upper inclined face 311, lower inclined face 311') (FIG. 5). Bulged portions (upper bulged portion 24, lower bulged portion 24') may be provided at the corners, by one of which the front face 11 and the upper lateral face 21 are connected, and by rest of which the front face 11 and the lower lateral face 21' of the small groove are connected as illustrated in FIG. 6.

FIG. 5 is a sectional view corresponding to FIG. 2 illustrating the bumper reinforcement member 1 of another example in which the small groove 2 is formed at the main reinforcement member 14 of the rear face opened sectional structure, and respective former parts of the upper lateral face 31 and lower lateral face 31' of the large groove 3 are formed as upper inclined face 311 and lower inclined face 311'. In this example the supplementary reinforcement member 15 positions at back side of the main reinforcement member 14 and forms the large groove.

The bumper reinforcement member 1 of another example illustrated in FIG. 5 is same as the example of FIGS. 1 and 2, except for that the small groove 2 of FIG. 5 is wider than that of FIG. 2 and the inclined faces 311, 311' are provided instead of the former portions of the lateral faces 31, 31'. Owing to the inclined faces 311, 311', the small groove 2, which is wider than large groove 3, is totally encompassed by the large groove 3. Specifically, the supplementary reinforcement member 15 has the front face opened sectional structure with the large groove 3 including the upper lateral face 31, the lower lateral face 31', and the groove bottom face 32. Furthermore, respective former parts of the lateral faces 31, 31' of the large groove are formed as the inclined faces 311, 311' where a region space surrounding the small groove 2 with the upper and lower lateral faces 31, 31' gradually becomes smaller. The connection flanges (upper connection flange 151, lower connection flange 151') extending from the front edges of the respective inclined faces 311, 311' are connected to the back side of the front face 11 of the main reinforcement member 14 by spot welding. The groove bottom face 32 of the large groove is also connected to the vehicle body 4 by spot welding.

The inclined faces 311, 311' are formed up to ⅗ of the depth L of the large groove 3. The inclined faces 311, 311' are respectively inclined at 25 degrees with respect to the lateral faces 31, 31' of the large groove (inclination angle θ=25°). The inclined faces 311, 311' are deformed so as to bulge out towards the small groove 2 due to the presence of the corners adjacent to themselves (inclined faces 311, 311'). Therefore, the deformation of the large groove 3 and the deformation of the small groove 2 can be easily opposed. The inclined faces 311, 311' substantially elongate the length of the lateral faces 31, 31' of the large groove. The inclined faces 311, 311' are used when it is necessary to increase the width of the small groove 2 according to the vehicle design. In particular, the inclined faces 311, 311' are useful when the width of the small groove 2 is needed to be relatively larger than the width of the large groove 3 (compare FIG. 2 and FIG. 5 for the width of the small groove 2 and the width of the large groove 3).

FIG. 6 is a sectional view corresponding to FIG. 2 illustrating the bumper reinforcement member 1 of another example in which whole structure is same as the example of FIG. 5 (see the description related to FIG. 5) except that respective bulged portions (upper bulged portion 24, lower bulged portion 24') are provided at the corners, by one of which the front face 11 and the upper lateral face 21 are connected, and by rest of which the front face 11 and the lower lateral face 21' of the small groove are connected. Each bulged portion 24, 24' has a semicircular arc shaped cross section projecting towards the front side from the front face 11.

Furthermore, in this example, supplementary bulged portions (upper supplementary bulged portion 26, lower supplementary bulged portion 26') for synchronizing the impact with an obstacle are respectively formed at corners connecting the front face 11 of the bumper and the upper lateral faces 12 and the lower lateral face 12' of the bumper. A configuration of the supplementary bulged portions is similar to the bulged portion 24.

Figure 7:
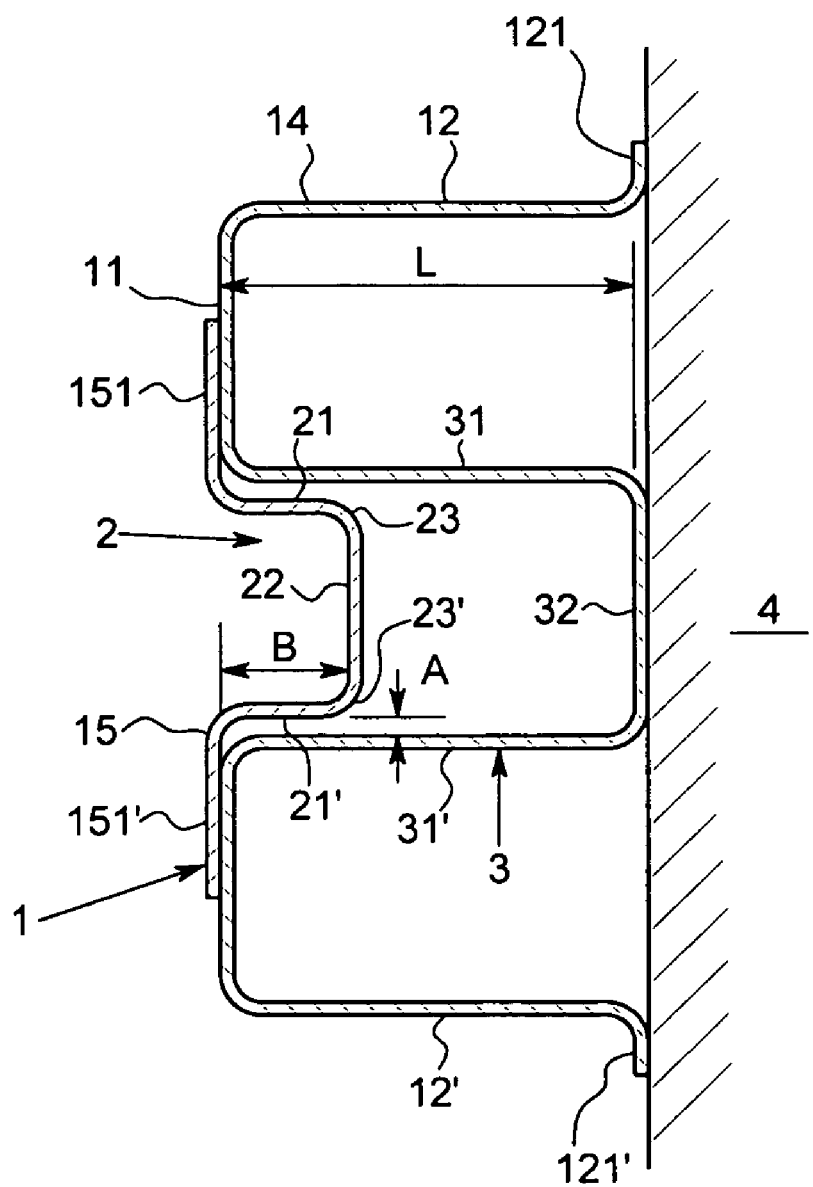
FIG. 7 is a sectional view illustrating the bumper reinforcement member of another example in which the large groove is formed at the main reinforcement member of the rear face opened sectional structure and the supplementary reinforcement member is the small groove.
Figure 8:
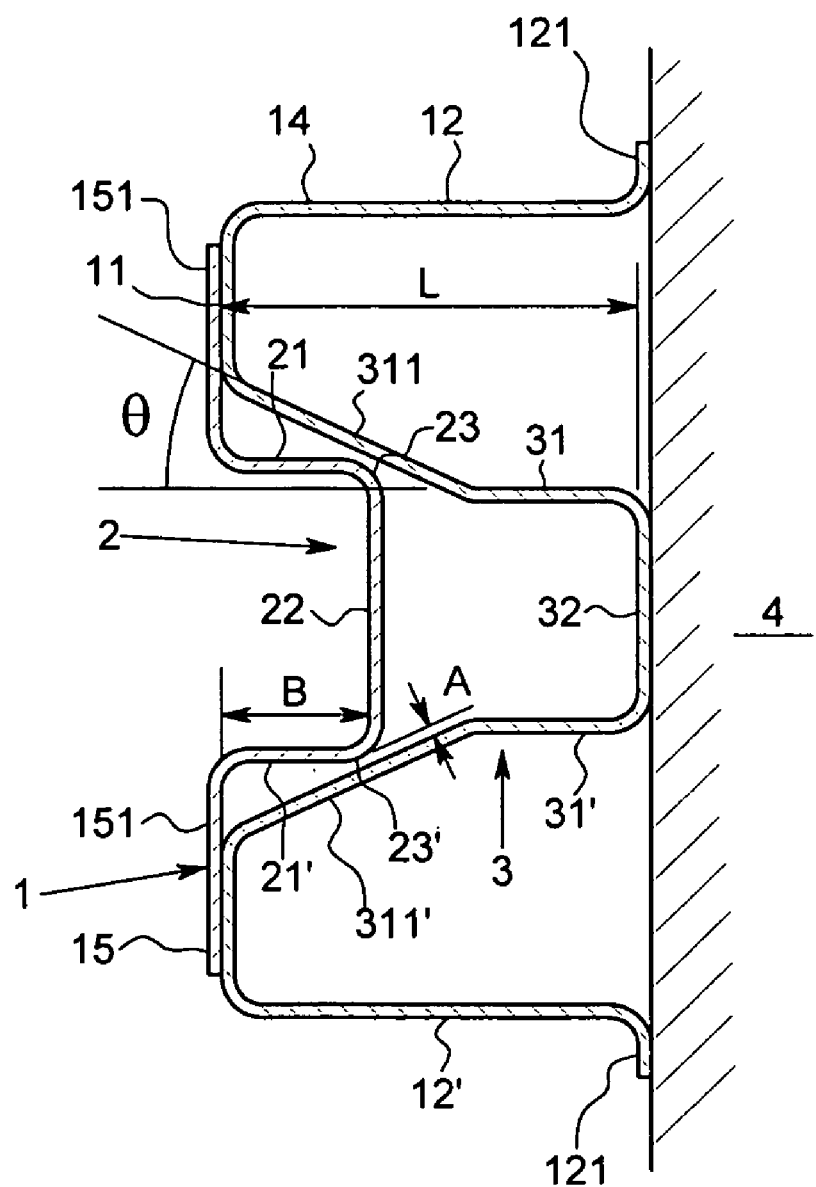
FIG. 8 is a sectional view corresponding to FIG. 2 illustrating the bumper reinforcement member of another example in which the large groove is formed at the main reinforcement member of the rear face opened sectional structure, respective former parts of the upper and lower lateral faces of the large groove are the inclined faces, and the supplementary reinforcement member is the small groove.
Figure 9:
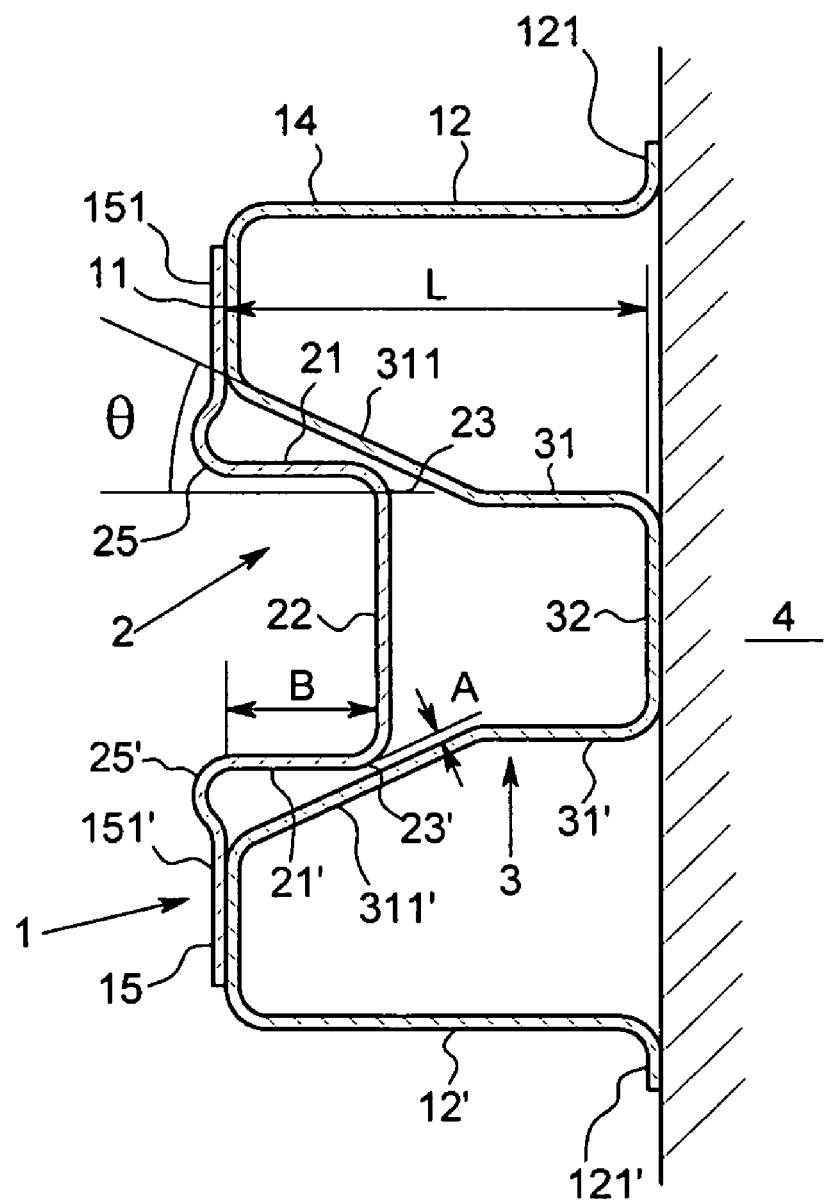
FIG. 9 is a sectional view corresponding to FIG. 2 illustrating the bumper reinforcement member of another example in which the large groove is formed at the main reinforcement member of the rear face opened sectional structure, former part of the upper and lower lateral faces of the large groove are the inclined faces, the supplementary reinforcement member is the small groove, and a pair of bulged portions is provided at a pair of corners connecting the connection flanges and the upper and lower lateral faces of the small groove.

As illustrated in FIGS. 7 to 9, the present example of FIG. 1 and FIG. 2, and other examples of FIG. 5 and FIG. 6 may interchange the arrangement of the main reinforcement member 14 and the supplementary reinforcement member 15.

FIG. 7 is a sectional view illustrating the bumper reinforcement member 1 of another example in which the large groove 3 is formed at the main reinforcement member 14 of the rear face opened sectional structure and the supplementary reinforcement member 15 is the small groove 2.

In the bumper reinforcement member 1 of another example illustrated in FIG. 7, the arrangement of the main reinforcement member 14 and the supplementary reinforcement member 15 are interchanged in the above mentioned example of FIG. 1 and FIG. 2. The main reinforcement member 14 is a member of the rear face opened sectional structure including the front face 11 of the bumper, the upper lateral face 12, and the lower lateral face 12'. The front face 11 is formed with the large groove 3 of channel shaped cross section including the upper lateral face 31, the lower lateral face 31', and the groove bottom face 32. The rear edges (upper rear edge 121, lower rear edge 121') of the upper and lower lateral faces 12, 12' and the groove bottom face 32 of the large groove are connected to the vehicle body 4 by spot welding and the like. The supplementary reinforcement member 15 is a member of the front face opened sectional structure having a cross section of a flanged hat with the small groove 2 of channel shaped cross section including the upper lateral face 21, the lower lateral face 21', and the groove bottom face 22. The connection flanges (upper connection flange 151, lower connection flange 151') arranged at the respective front edges of the upper and lower lateral face 21, 21' of the small groove are connected to the front side of the front face 11 of the main reinforcement member 14 by spot welding and the like. Other configurations and force-stroke properties are the same as the example of FIG. 1 and FIG. 2.

FIG. 8 is a sectional view corresponding to FIG. 2 illustrating the bumper reinforcement member 1 of another example, in which the large groove 3 is formed at the main reinforcement member 14 of the rear face opened sectional structure, the and respective former parts of the upper lateral face 31 and lower lateral face 31' of the large groove 3 are formed as upper inclined face 311 and lower inclined face 311'. In this example the supplementary reinforcement member 15 positions at front side of the main reinforcement member 14 and forms the small groove wider and sallower than the large groove.

The bumper reinforcement member 1 of another example illustrated in FIG. 8 is same as the example of FIG. 7, except for that the small groove 2 of FIG. 8 is wider than that of FIG. 7 and the inclined faces 311, 311' are provided instead of the respective former portions of the lateral face 31, 31'. Owing to the inclined faces 311, 311', the small groove 2, which is wider than large groove 3, is totally encompassed by the large groove 3. Specifically, the main reinforcement member 14 is a member of the rear face opened sectional structure including the front face 11, the upper lateral face 12, and the lower lateral face 12. The front face 11 of the bumper is formed with the large groove 3 including the upper lateral face 31, the lower lateral face 31, and the groove bottom face 32. The respective former parts of the upper lateral face and lower lateral face 31, 31' of the large groove are the inclined faces 311, 311' where the space gradually becomes smaller in a region surrounding the small groove 2 with the upper and lower lateral faces 31, 31'. Other configurations, how the main reinforcement member, the supplementary reinforcement member and the vehicle side are connected, and the force-stroke properties are the same as the example of FIG. 7.

FIG. 9 is a sectional view corresponding to FIG. 2 illustrating the bumper reinforcement member 1 of another example in which whole structure is same as the example of FIG. 8 except that a pair of bulged portions (upper bulged portion 24, lower bulged portion 24') are provided at the pair of corners, by one of which the front face 11 and the upper lateral face 21 are connected, and rest of which the front face 11 and the lower lateral face 21' of the small groove are connected. Each bulged portion 24, 24' has a semicircular arc shaped cross section projecting towards the front side from the front face 11. For other configurations such as a positional relationship of the main reinforcement member and the supplementary reinforcement member, how each member is attached and others, see the description of FIG. 9.

Figure 10:
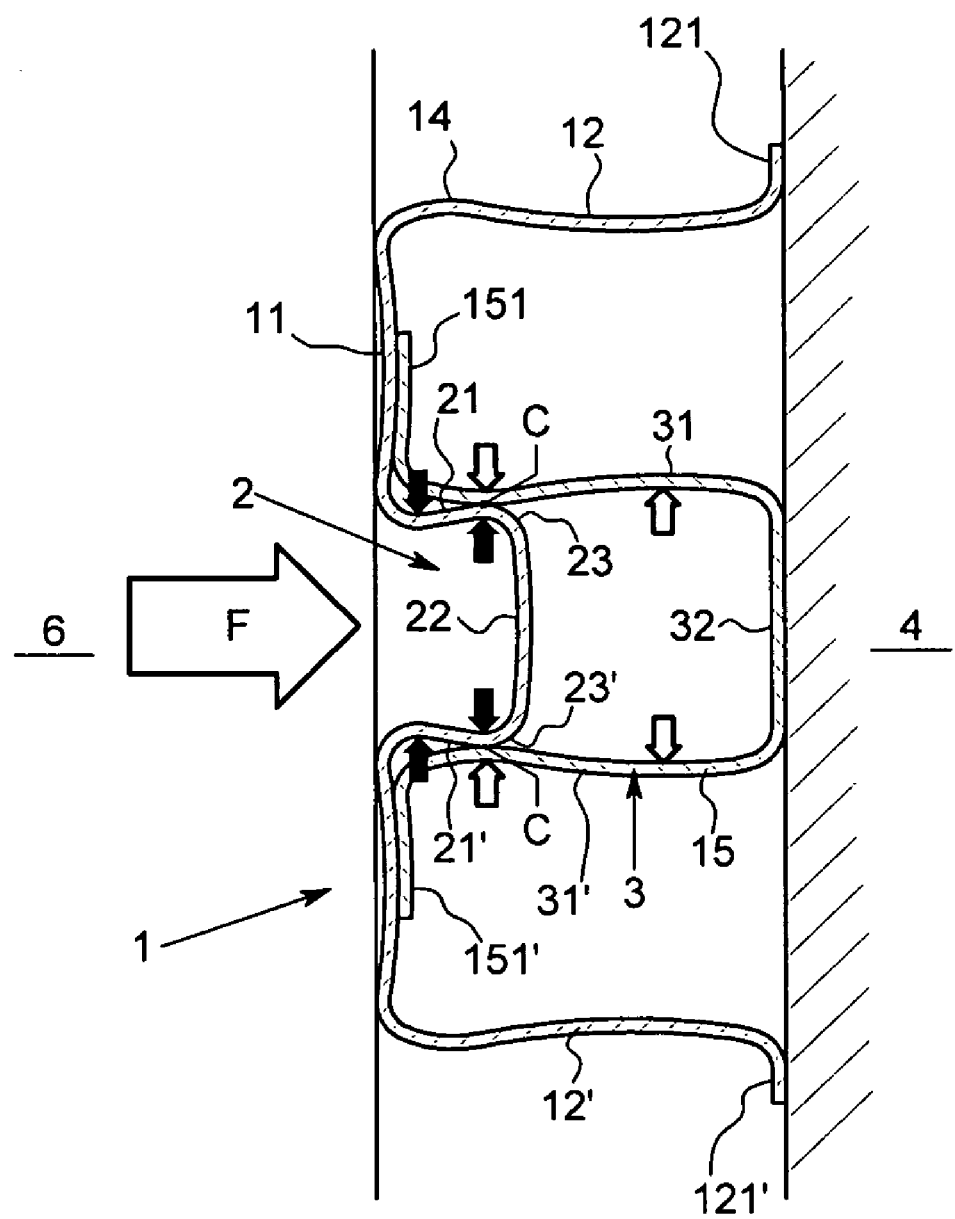
FIG. 10 is a sectional view illustrating a state in which the bumper reinforcement member of the present example is deformed when a load F is applied to the front face of the bumper.

The deformation of each portion when subjected to impact by the bumper reinforcement member 1 of the present example (FIG. 1 and FIG. 2) is illustrated in FIG. 10. FIG. 10 is a sectional view illustrating a state in which the bumper reinforcement member 1 of the present example is deformed when a load F is applied to the front face 11. The load F on the entire face of the bumper is applied evenly from above and below by an application member 6 of a test device of FIG. 11. In this case, the front face 11 of the bumper surrounding the small groove 2 is concaved in a rear face direction, as in FIG. 10. The bumper lateral face 12 makes substantially the former half bulge outward and substantially the latter half bulge inward.

The lateral faces 31, 31' of the large groove are deformed vertically symmetric with respect to the bumper lateral faces 12, 12'. In other words, the respective lateral faces 31, 31' of the large groove make substantially the former half make inward and substantially the latter half bulge outward (see outlined arrow in FIG. 10). Similar to the lateral faces 31, 31' of the large groove, the lateral face 21, 21' of the small groove make substantially the former half bulge inward and substantially the latter half bulge outward (see black arrow in FIG. 10), which is vertically symmetric with respect to the bumper lateral face 12, 12'. In the bumper reinforcement member 1 of the present example, the depth B of the small groove 2 is 3/10 of the depth L of the large groove 3. Therefore, immediately after the small groove 2 and the large groove 3 start to be deformed, the former half of the lateral faces 31, 31' of the large groove that bulge inward and the latter half of the lateral faces 21, 21' of the small groove that bulge outward collide at a colliding point C. The small groove 2 and the large groove 3 keep pushing each other thereafter, and thus the respective deformations are suppressed. Consequently, high peak load and large gross amount of energy absorption are realized.

Figure 11:
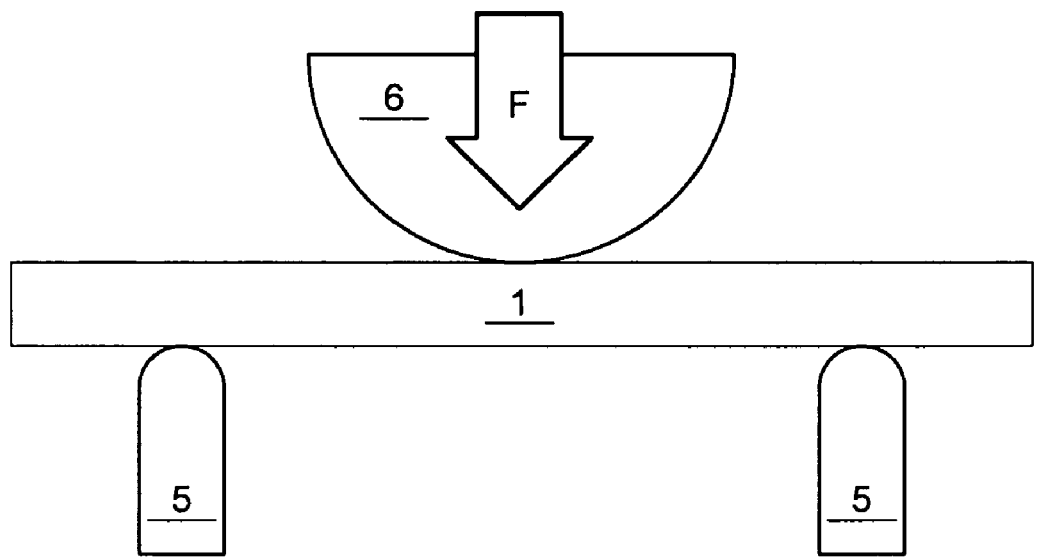
FIG. 11 is a view schematically illustrating a test device of a three-point bending load test for applying a load F in each example and the comparative example.

The three-point bending load test was conducted to evaluate the force-stroke properties of the bumper reinforcement member of the present invention and the comparative example. FIG. 11 is a schematic view illustrating a test device for the three-point bending load test for applying the load F to the bumpers used in the examples and the comparative examples. FIGS. 12 to 16 are sectional views of bumpers of a first example to a third example, a first comparative example, and a second comparative example. The test device used in the three-point bending load test is a generally known device. Specifically, as in FIG. 11, a long bumper reinforcement member is supported by supporting members 5, 5 on the bumper rear face 13 side at symmetric position with respect to left and right. Each supporting member 5 has a distal end face of an arcuate cross section. The front face of the bumper is pushed at the middle in the extending direction by the application member 6 having a distal end face of an arcuate cross section to apply the load F.

Basic configurations such as material, plate thickness and other parameters of the bumpers in the first to second examples and also in the comparative examples ware unified. Those ware; 980 MPa material having a plate thickness of 1.2 mm was used both for the main reinforcement member and the supplementary reinforcement member; the height WA of the bumper reinforcement member of each example and each comparative example, that is, the height of the main reinforcement member (orthogonal distance between respective outer faces of the lateral faces 12, 12' of the bumper) was 100 mm; and a depth DA of the bumper reinforcement member, that is, the depth of the main reinforcement member (length of the lateral face 12, 12') was 45 mm; the radius R of the circular arc (radius of the inner side of the cross section) at the corner connecting each face was 3 mm; the length in the extending direction in each example and each comparative example was 1200 mm. The bumper reinforcement member of each example and each comparative example was provided to the three-point bending load test. The bumper reinforcement member was supported with the supporting members 5, 5 arranged with a space of 880 mm.

Figure 12:
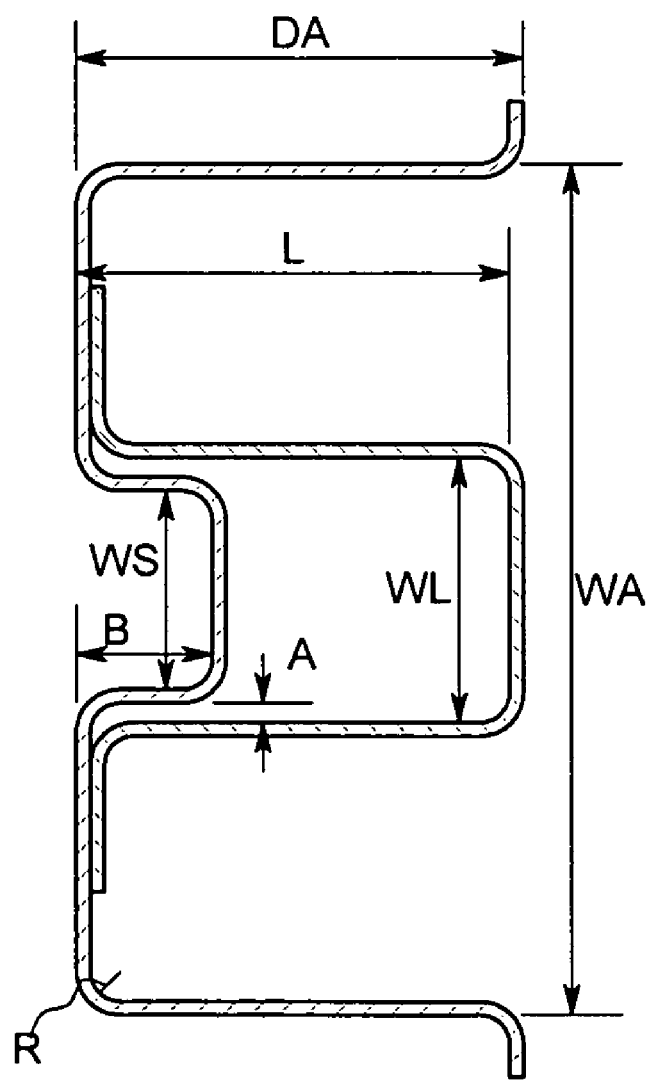
FIG. 12 is a sectional view of the first example corresponding to FIG. 2.

As apparent from FIG. 12, the first example corresponds to FIG. 2. The depth L of the large groove was 43.6 mm, the width WS of the small groove (space between inner surfaces of the opposing lateral faces of the small groove) was 20.4 mm, the distance A was 2 mm (A=about 1/20 L), and the depth B of the small groove was 13.6 mm (B=about 1/3 L).

Figure 13:
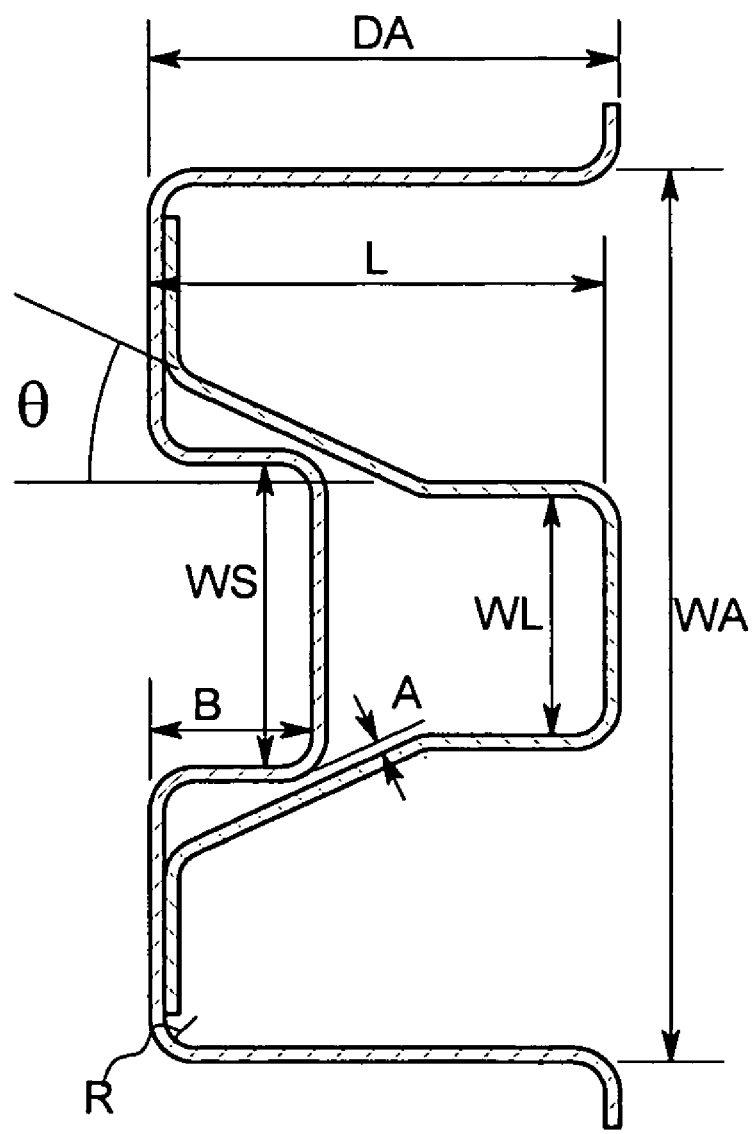
FIG. 13 is a sectional view of the second example corresponding to FIG. 5.

As apparent from FIG. 13, the second example corresponds to FIG. 5. The width WL of the large groove (space of inner surfaces of the large groove) was 30 mm, the length L of the large groove was 43.8 mm, the inclined faces ware within the range of 17.6 mm (about 1/2.5 L) from the front face of the bumper, the inclination angle θ with respect to the lateral faces of the large groove was 25 degrees, the width WS of the small groove (space between inner surfaces of the opposing lateral faces of the small groove) was 30 mm, the distance a was 1 mm (a=about 1/40 L), and the depth B of the small groove was 13.8 mm (B=about 1/3 L).

Figure 14:
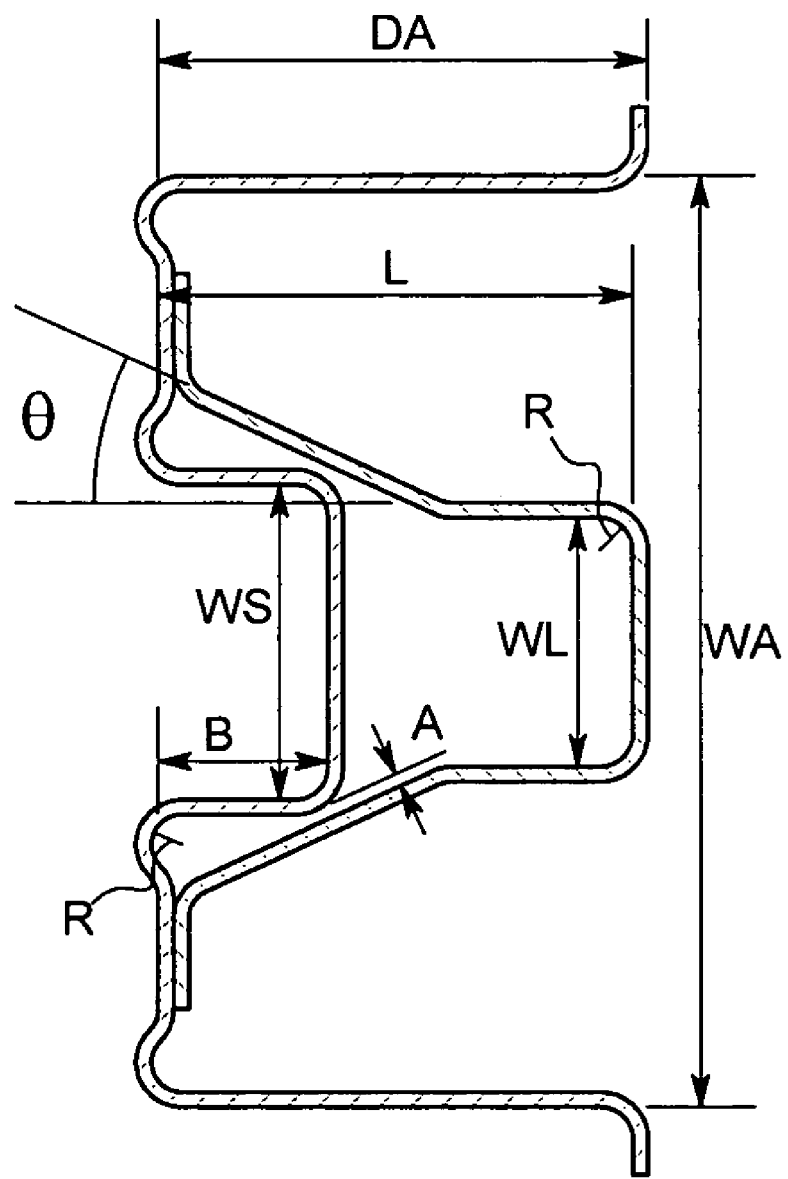
FIG. 14 is a sectional view of the third example corresponding to FIG. 6.

As apparent from FIG. 14, the third example corresponds to FIG. 6. The width WL of the large groove (space of inner surfaces of the opposing lateral faces of the large groove) was 30 mm, the length L of the large groove was 43.8 mm, the inclined face was within the range of 17.6 mm (about 1/2.5 L) from the front face of the bumper, the inclination angle θ with respect to the lateral face of the large groove was 25 degrees, the width WS of the small groove (space of inner surfaces of the opposing lateral faces of the small groove) was 30 mm, the distance A was 1 mm (A=about 1/40 L), and the depth B of the small groove was 13.8 mm (b=about 1/3 L). The bulged portions had the cross section projecting out 2 mm from the front face of the bumper of semicircular arc shape, where the radius R was 3 mm. Furthermore, the third example had the supplementary bulged portions that were brought in contact with the application member at the same time as the bulged portions arranged at the corners connecting the front face and the lateral faces of the bumper. The supplementary bulged portions projected out 2 mm, similar to the bulged portion.

Figure 15:
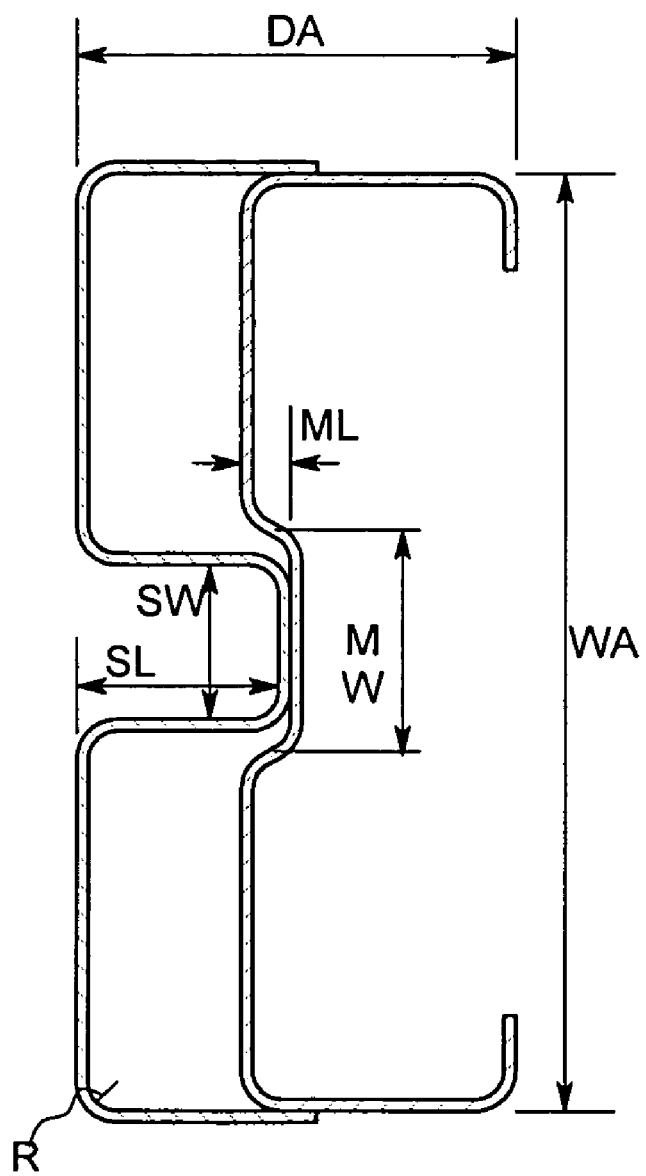
FIG. 15 is a sectional view of the first comparative example corresponding to JP2003-237507A.

As apparent from FIG. 15, the first comparative example corresponds to patent JP2003-237507A. The structure was such that the supplementary reinforcement member was attached to the front face of the main reinforcement member having a depth of 28 mm so that the depth became 17 mm. The groove formed in the main reinforcement member had a width MW of 28 mm and a depth ML of 14.8 mm, and the groove formed in the supplementary reinforcement member had a width SW of 16 mm and a depth SL of 20.8 mm.

Figure 16:
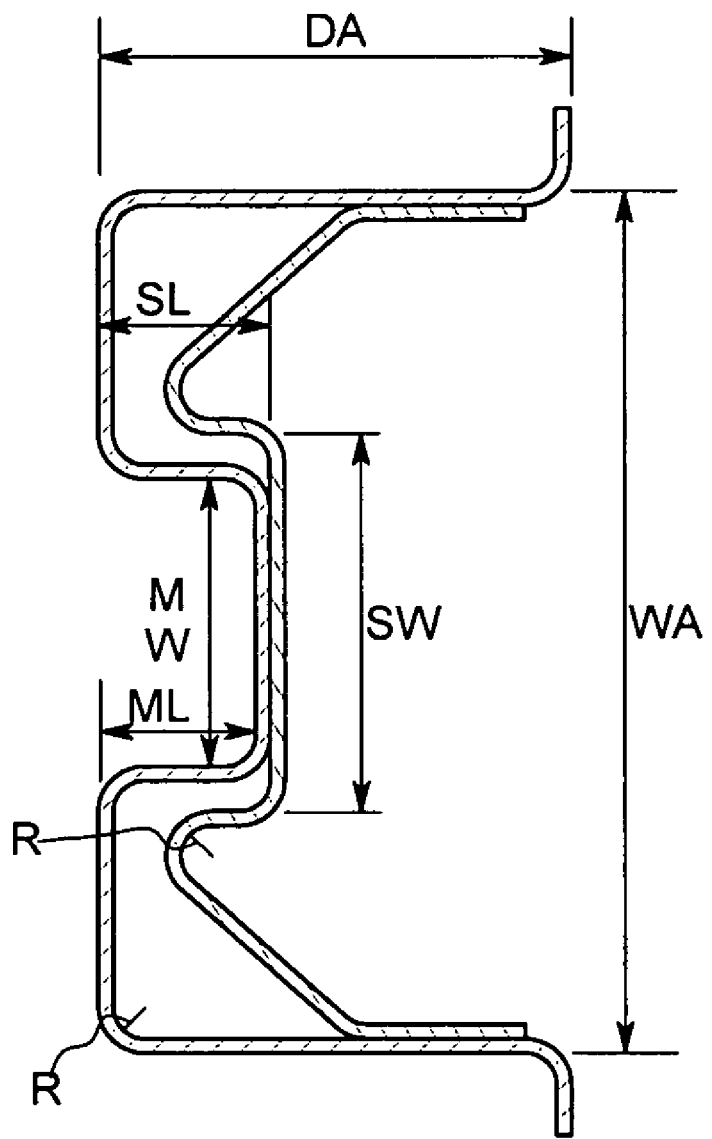
FIG. 16 is a sectional view of the second comparative example corresponding to JP2004-074834A.

As apparent from FIG. 16, the second comparative example corresponds to JP2004-074834A. The structure was such that the supplementary reinforcement member was attached to the inner side of the main reinforcement member. The groove formed in the main reinforcement member had a width MW of 23 mm and a depth ML of 5 mm, and the groove formed in the supplementary reinforcement member had a width SW of 36.9 mm and a depth SL of 16.4 mm. The hill-shape and the projection sites, which ware the characteristics of the second comparative example, ware formed at positions spaced apart by 5 mm from the back side of the front face of the bumper. The projection site had a semicircular arc shaped cross section, where the radius R was 3 mm, similar to other corners.

Figure 17:
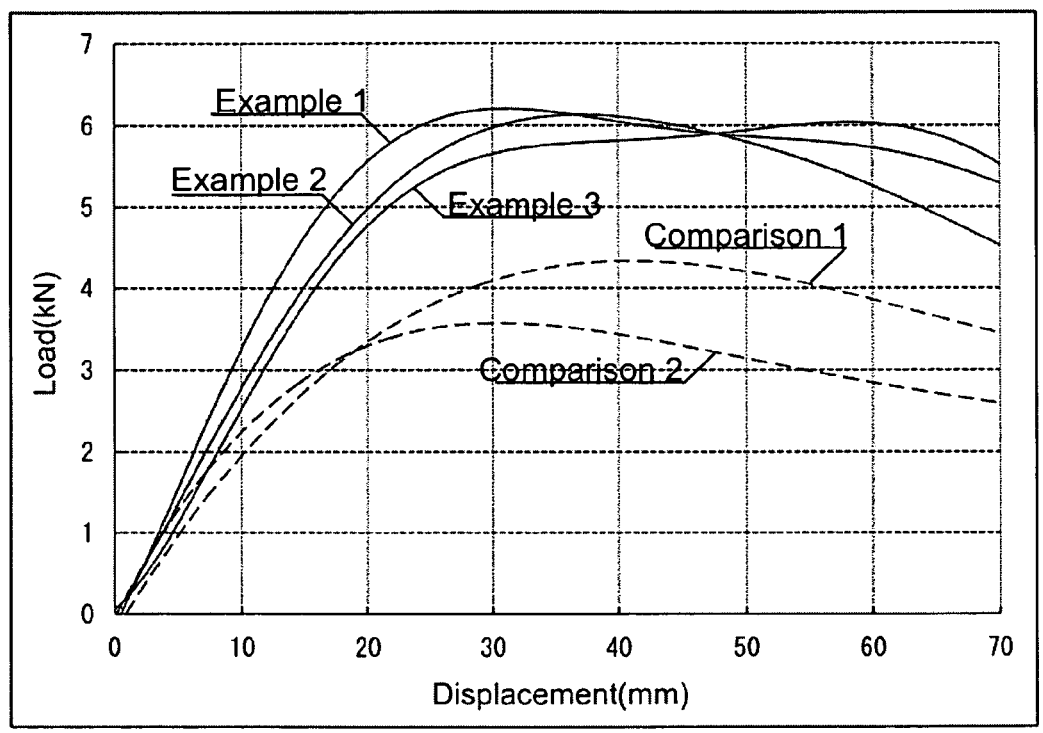
FIG. 17 shows a force-stroke curve indicating the result of the three-point bending load test for the examples and the comparative examples.

FIG. 17 is a force-stroke curve showing the result of the three-point bending load test for each example and each comparative example. In creating the force-stroke curve, the peak load and gross amount of the energy absorption ware converted to a value per unit mass. As apparent from the force-stroke curve, the first example to the third example had a high peak load and a large energy absorption amount compared to the first comparative example and the second comparative example. The first example to the third example had stable energy absorption since the depression after reaching the peak load was small. In particular, the third example including the bulged portion needed larger displacement amount for reaching the peak load and had a larger energy absorption amount than the second example.

Figure 18:
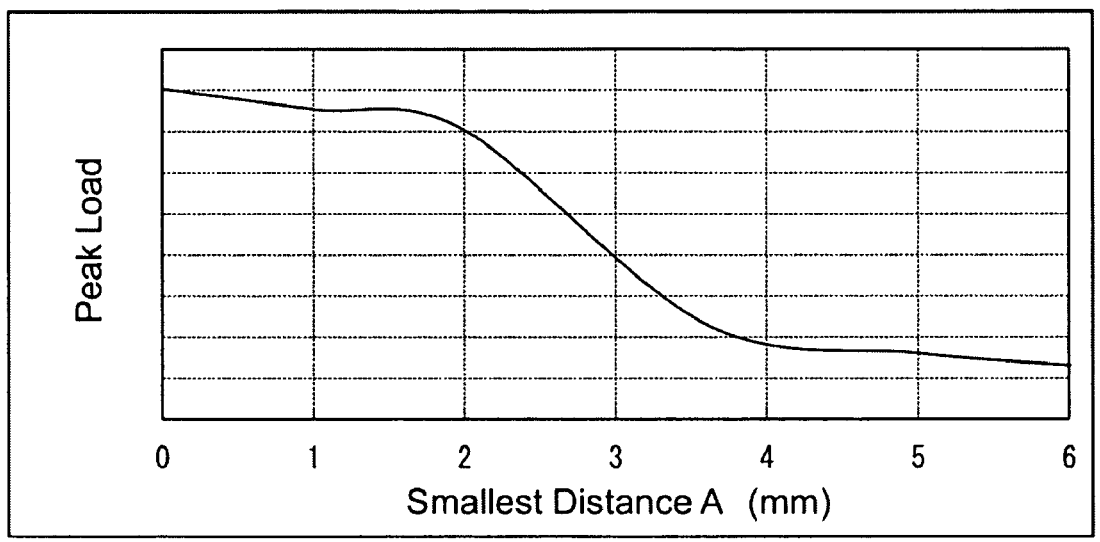
FIG. 18 is a graph showing the relationship between a distance A and a peak load.
Figure 19:
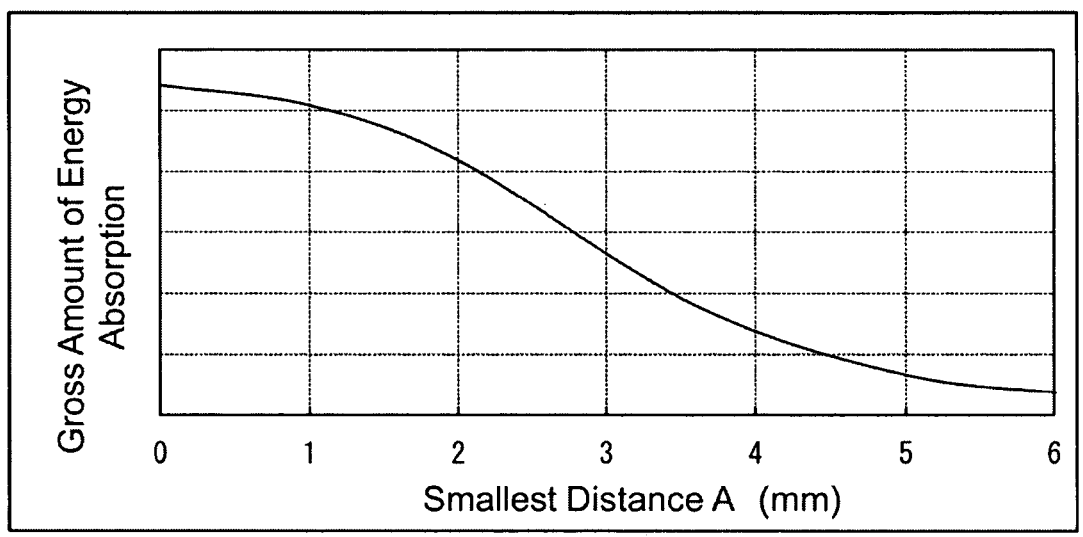
FIG. 19 is a graph showing the relationship between a distance A and the energy absorption amount.
Figure 20:
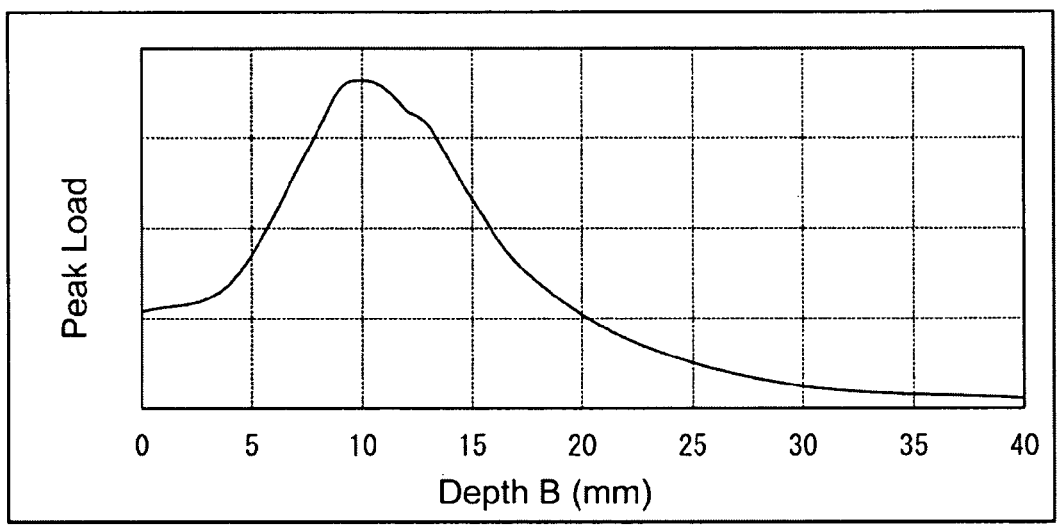
FIG. 20 is a graph showing the relationship between a depth B of the small groove and a peak load.
Figure 21:
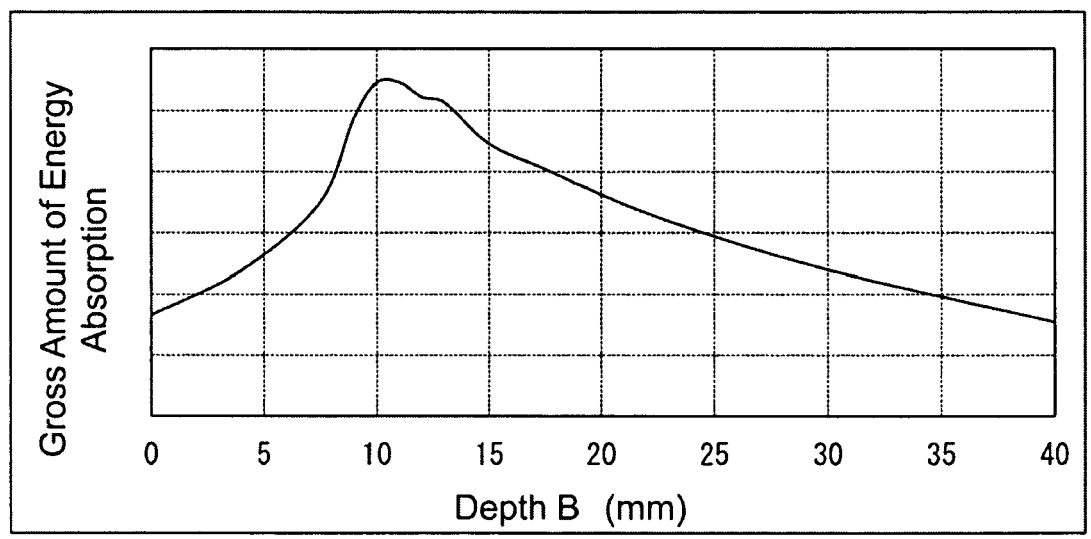
FIG. 21 is a graph showing the relationship between the depth B of the small groove and the energy absorption amount.

With regards to the first example serving as a representative of the bumper reinforcement member of the present invention, the relationship between the distance A or the depth B of the small groove and the peak load or the energy absorption amount was checked. The configuration of the test device and the configuration of the first example are as described above. FIG. 18 is a graph showing the relationship between the distance A and the peak load. FIG. 19 is a graph showing the relationship between the distance A and the gross amount of energy absorption. FIG. 20 is a graph showing the relationship between the depth B of the small groove and the peak load. FIG. 21 is a graph showing the relationship between the depth B of the small groove and the gross amount of energy absorption. The gross amount of energy absorption was measured from the application member collided with the front face of the bumper of first example to the displacement amount reached 80 mm.

In the three-point bending load test for examining the relationship between the distance A and the peak load or the gross amount of energy absorption, the depth B of the small groove was fixed at 12 mm (about 1/4 L), and the distance A was changed from 0 mm to 6 mm (about 1/7 L). As a result, as shown in FIG. 18 and FIG. 19, in a case where the distance A was "0 (zero)", that is, a case where the respective corners connecting the upper and lower lateral faces of the small groove and the groove bottom face of the small groove ware in contact with the upper and lateral faces of the large groove was found to be most preferable. The gross amount of energy absorption gradually became smaller as the distance A became larger. The peak load started to rapidly lower when the distance A exceeded 2 mm, that is, about 1/20 L (L=43.6 mm). Lowering of the peak load stopped when the distance A exceeded 4 mm, that is, about 1/10 L. Therefore, the peak load became high and the gross amount of energy absorption became large if the distance A was smaller than or equal to 1/10 L.

In the three-point bending load test for examining the relationship between the depth B of the small groove and the peak load or the gross amount of energy absorption, the distance A was fixed at 1 mm (about 1/40 L), and the depth B of the small groove was changed from 0 mm to 40 mm (about 1 L). As a result, as shown in FIG. 20 and FIG. 21, the peak load and the gross amount of energy absorption were both found to be a maximum when the depth B of the small groove was 10 mm, that is, about 1/4 L. When the depth B of the small groove became small or large, both the peak load and the energy absorption property became small. The change in the gross amount of energy absorption was relatively smooth even if the depth B became large. However, if the depth B of the small groove was from 1/10 L to 1/2 L, the peak load was increased.

What is claimed is:

1. A bumper reinforcement member of a hollow section comprising a front face, a pair of upper and lower lateral faces; wherein
a small groove and a large groove concaved to back side, which have channel shaped cross section and housed in the hollow section, are provided at the front face; and
the small groove includes a pair of upper and lower lateral faces, and a groove bottom face, the large groove includes a pair of upper and lower lateral faces, and a groove bottom face, an open space is provided between the groove bottom face of the small groove and the groove bottom face of the large groove, and the pair of upper and lower lateral faces of the small groove is totally encompassed by the pair of upper and lower lateral faces of the large groove;
the bumper reinforcement member is configured by a main reinforcement member and a supplementary reinforcement member, which are made through sheet-metal processing, the supplementary reinforcement member being positioned at back side of the main reinforcement member and being attached to the main reinforcement member;

the main reinforcement member is a hollow sectional member including the front face and the pair of upper and lower lateral faces, the small groove of channel shaped cross section including the pair of upper and lower lateral faces and the groove bottom face being provided at the front face;

the supplementary reinforcement member is a member having a front face opened structure including the pair of upper and lateral faces and the groove bottom face forming the large groove of an opened channel shaped cross section, the supplementary reinforcement member being connected to the main reinforcement member through a connection between front edges of the upper and lower lateral faces of the large groove and back side of the front face of the main reinforcement member, and connected to a vehicle side through a connection between the groove bottom face of the large groove and the vehicle side; and the main reinforcement member is connected to the vehicle side through a connection between the vehicle side and rear edges of the upper and lower lateral faces of the main reinforcement member.

2. The bumper reinforcement member according to the claim 1, wherein a distance A, which is defined by the smallest distance between the pair of upper and lower lateral faces of the large groove and a pair of corners of the small groove connecting the upper and lower lateral faces and the groove bottom face, a depth B of the small groove, which is defined by a distance between the front face of the bumper reinforcement member and the groove bottom face of the small groove, and a depth L of the large groove, which is defined by a distance between the front face of the bumper reinforcement member and the groove bottom face of the large groove meet a following condition;

the distance A is from 0 L to $\frac{1}{10}$ L, and the depth B is from $\frac{1}{10}$L to $\frac{1}{2}$L.

3. The bumper reinforcement member according to the claim 1, wherein at least former part of the pair of upper and lower lateral faces of the large groove, which totally encompasses the small groove, is fowled to a pair of inclined faces, so that a distance between the inclined faces becomes narrower towards the back side.

4. The bumper reinforcement member according to the claim 3, wherein a pair of bulged portions is formed at a pair of corners, one of the corners connects the upper lateral face of the small groove and the front face of the reinforcement member, and a rest of the corners connects the lower lateral face of the small groove and the front face of the main reinforcement member.

* * * * *